United States Patent [19]
Adams, Jr.

[15] 3,662,198
[45] May 9, 1972

[54] TRACTION MOTOR INSPECTION COVER

[72] Inventor: John Adams, Jr., 250 South Oak Knoll Avenue, Pasadena, Calif. 91106

[22] Filed: Dec. 4, 1970

[21] Appl. No.: 95,272

[52] U.S. Cl. ............................................. 310/89, 310/255
[51] Int. Cl. ........................................................... H02k 5/10
[58] Field of Search ........................... 310/88, 89, 255, 49

[56] References Cited

UNITED STATES PATENTS 2,279,148   4/1942   Sutherland............................... 310/89
3,506,860   4/1970   Rosenthal................................. 310/49

FOREIGN PATENTS OR APPLICATIONS 1,036,994   8/1958   Germany................................... 310/89

Primary Examiner—D. F. Duggan
Attorney—Luc P. Benoit

[57] ABSTRACT

A railroad electric traction motor has a hinged door of curved rigid sheet metal for closing and conveniently opening a square inspection opening in the periphery of the curved motor housing which encloses the commutator. The door has a lock which is operable from the outside of the rigid sheet, but which has all of its parts located below the sheet top surface.

13 Claims, 3 Drawing Figures

PATENTED MAY 9 1972

3,662,198

INVENTOR.
JOHN ADAMS, JR.
BY Luc P. Benoit
ATTORNEY.

TRACTION MOTOR INSPECTION COVER

BACKGROUND OF THE INVENTION

1. Field of the Invention

The subject invention relates to railroad electric traction equipment and, more particularly, to a cover for an inspection opening in such equipment.

2. Description of the Prior Art

The expression "railroad electric traction motor" as herein employed refers primarily to electric traction motors in diesel-electric railroad locomotives and also to traction motors used in electric railroads and railways and having commutator equipment for feeding electric current to the rotor.

It has been customary since early times to provide electric traction motors with an opening permitting access to, and the inspection of, vital motor parts located inside the motor housing and including notably the commutator equipment. An early reference in this area shows an electric railway motor with a hinged door on an opening in the motor housing (see U.S. Pat. No. 672,952, by F.A. Merrick, issued Apr. 1901).

While a hinged construction of the door or cover permits a convenient opening thereof, the apparent lack of door locking means in that reference practically limits the location of the inspection opening to the top of the motor housing where the door will be so positioned that gravitational forces will keep it in a closed position. In practice, a locking device is, however, still necessary since railroad traction motors are subject to vibrational forces during the travel of the locomotive which will cause unlocked doors or covers to clatter. Moreover, the top of electric traction motors in modern locomotives is typically not readily accessible, since these motors are usually located between the driving wheels of the locomotive at the lower portion of the engine frame.

Another prior-art proposal for securing the cover of a dynamo-electric machine provides movable handles which are pivoted on bolts that are threaded into lugs on the motor housing. Each handle has a cam which engages the cover and which works over a dead-center so as to retain the cover in place until the handles are manually actuated to a release position (see U.S. Pat. No. 596,135, by N.C. Bassett, issued Dec. 28, 1897).

The latter proposal apparently still was subject to clatter and accidental release of the door, so that it became necessary to provide cross strips of resilient material, such as leaf spring stock, for biasing the cover relative to the motor housing (see U.S. Pat. No. 878,167, by J.E. Webster, issued Feb. 4, 1908). This proposal inherently provides an open crack between the cover and the motor housing. Larger openings of this type would no longer be tenable in modern traction motors where a loss of forced cooling air from the inside of the housing or a contamination of delicate parts from the outside of the housing has to be carefully avoided.

As is for instance mentioned in the German Pat. No. 1,036,994, by Siemens-Schuckertwerke Aktiengesellschaft, published Jan. 28, 1960, it became, therefore, customary to provide a sealing gasket between a hinged cover which was retained in a closed position by a manually releasable toggle mechanism. This apparently led to objectionable sliding movements between the cover gasket and the motor housing during opening and closing of the cover. These sliding movements accelerated the wear of the sealing gasket so that the quoted German Patent proposed the use of a linking mechanism which was made of bent steel spring wire having V-shaped arms that provide part of an over-center toggle mechanism designed to permit opening and closing of the inspection opening without undue friction between the cover gasket and the motor housing.

More recent proposals employ hinged covers of flexible sheet metal which have latches mounted thereon. The latches are of a spring-biased over-center or toggle type that co-operates with a catch or keeper on a cover frame in stretching the flexible cover over the inspection opening in the motor housing, thereby establishing an airtight fit of a sealing gasket between the flexible cover and the cover frame around the inspection opening (see U.S. Pat. No. 3,506,860, by S.N. Rosenthal, issued Apr. 14, 1970.

All the latch or toggle-action mechanisms so far discussed have several disadvantages in practice. For instance, over-center release mechanisms tend to be hard on the fingers of the user. This is particularly the case in designs in which the closing latches have the purpose of stretching and bending a flexible cover. To accomplish that purpose, the latch springs have to provide substantial spring forces which develop considerable snapping power during the opening of the cover and call for high force exertions during cover closing operations. If attempts are made to relieve these detriments by the use of weaker latch springs, then the danger arises that the latches will be opened by vibratory forces occurring during the travel of the engine and that the latch springs will be incapable of stretching the flexible cover into sealing position so as to avoid the escape of forced cooling air from the motor housing.

Moreover, it is a matter of common experience that toggle-type latch mechanisms have low resistance against, and are easily damaged by, forces which act on the latch in a direction parallel to, and at a location spaced from, the pivot axis of the latch. This is particularly the case while the latch is in a released state.

Moreover, projecting latches are easily damaged when the traction motors are shipped on pallets or are turned over in the shop to be worked on.

SUMMARY OF THE INVENTION

The subject invention overcomes the above mentioned disadvantages and is practised in combination with a railroad electric traction motor.

The subject invention resides in the improvement comprising, in combination, commutator means, a curved motor housing enclosing said commutator means except for a commutator inspection opening in said housing, said commutator inspection opening having a first end, a second end spaced from said first end, and spaced sides extending between said first and second ends, a rigid sheet of metal curved substantially in conformity with the curvature of the housing at the inspection opening and having a length extending substantially from the first end to the second end of the inspection opening, and a width spanning the inspection opening from side to side and overlapping portions of the housing at the mentioned sides of the inspection opening. The rigid sheet has a top surface facing away from the inspection opening. The combination under consideration further includes hinge means connectable to the housing at the first end of the inspection opening and connected to the rigid sheet for permitting selective opening and closing of the inspection opening by the rigid sheet, lock means having first and second parts selectively engageable with each other and selectively disengageable from each other, means connectable to the housing for mounting the first part of the lock means on the housing at the second end of the inspection opening, and means connected to the rigid sheet for mounting the second part of the lock means below the top surface of the rigid sheet in a position wherein the first and second parts of the lock means are selectively engageable with each other upon closure of the inspection opening by the rigid sheet.

The expression "inspection opening" as herein employed is not intended to limit the particular opening to inspection purposes. Rather, the particular opening may be, and customarily is, employed for both the inspection of the commutator means and the servicing thereof.

BRIEF DESCRIPTION OF THE DRAWINGS

The invention will become more readily apparent from the following detailed description of a preferred embodiment thereof, illustrated by way of example in the accompanying drawings, in which.

DESCRIPTION OF THE PREFERRED EMBODIMENT

Figure 1:
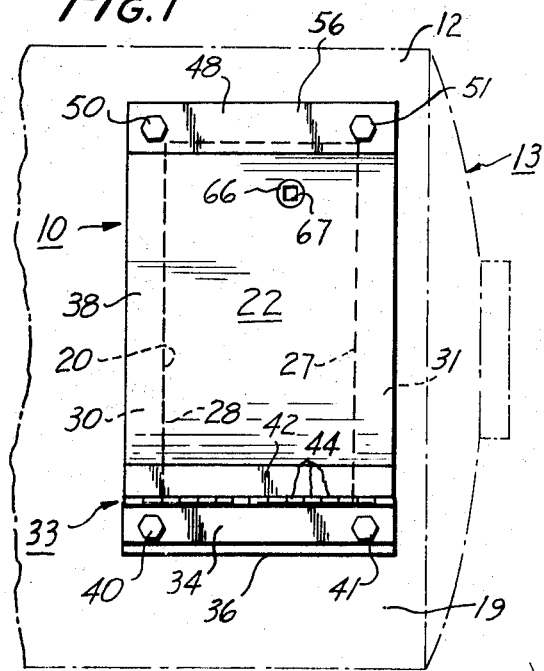
FIG. 1 is an elevation of a cover in accordance with a preferred embodiment of the subject invention and of adjacent parts of a traction motor housing.
Figure 2:
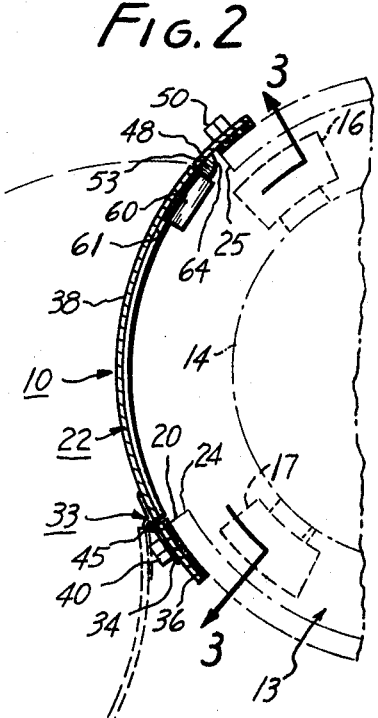
FIG. 2 is a sectional side view of the cover and of part of the motor housing of FIG. 1.

As shown in FIGS. 1 and 2, the cover 10 of the illustrated preferred embodiment is mounted on the curved housing 12 of a railroad electric traction motor 13.

The traction motor 13 has a commutator 14 which sits on the rotor shaft (not shown) and that is supplied with electric current through several brush assemblies, two of which are shown at 16 and 17. The commutator 14 and brush assemblies 16 and 17 may be of any suitable conventional design and construction so that a detailed showing thereof is unnecessary.

In practice, the traction motor 13 is mounted on the lower frame of the railroad locomotive or engine between the wheels and the wheel axles. The bottom of the motor housing 12 is approximately located at 19 when the traction motor 13 is located under the locomotive or engine.

The motor housing 12 has a substantially rectangular inspection opening 20 which permits access to the commutator means, including the commutator 14 and the brush assemblies 16 and 17 for inspection and/or servicing purposes.

In contrast to flexible prior-art covers, the cover 10 according to the subject invention comprises a rigid sheet of metal 22 curved substantially in conformity with the curvature of the motor housing 12 at the inspection opening 20. The curved rigid cover sheet 22 has several advantages over flexible covers. For instance, no springs or other biasing means between the cover 22 and the motor housing 12 have to be provided for stretching the sheet into tight engagement with the motor housing. A lack of these springs considerably simplifies the construction of the cover and the operation thereof. Moreover, the rigid sheet 22 acts as a sturdy shield which will withstand considerable abuse when the motor is turned over in the shop during the performance of work thereon.

The curved rigid sheet 22 has a length extending substantially from a first end 24 to a second end 25 of the inspection opening 20. The curved rigid sheet further has a width spanning the inspection opening 20 from side to side (i.e. from a side 27 to a side 28) and overlapping portions 30 and 31 of the motor housing 12 at the inspection opening sides 27 and 28.

As a further advantage, the rigid cover sheet 22 according to the subject invention obviates the need for the cover frame that was employed as part of the cover assembly in prior-art proposals which operated with a flexible cover sheet. Of course, the motor housing 12 may be provided with a raised and/or machined rim around the inspection opening 20, and the rigid sheet 22 may cooperate with such raised and/or machined rim. However, no separate frame need be provided as part of the cover assembly with the rigid cover sheet 22 according to the subject invention.

The cover 10 according to the subject invention further includes a hinge 33 having a first hinge plate 34 connected to the motor housing 12 at the first end 24 of the inspection opening 20. It will be noted in this connection that the first end 24 is nearer the bottom 19 of the motor housing 12 than the second end 25 of the inspection opening 20. Accordingly, the cover sheet 22 swings downwardly about the hinge 33 when it is moved to an open position as shown in dotted lines at 22' in FIG. 2. This arrangement of the hinge 33 is more advantageous than prior-art arrangements which placed the cover hinge at the top end 25 of the inspection opening 20. It has been found in practice that the opened cover is less in the way of inspecting and servicing personnel and is less apt to collide with equipment at the lower engine frame when the cover sheet 22 is hinged nearer the bottom of the motor housing 12 as shown in FIGS. 1 and 2.

In the illustrated embodiment, the hinge plate 34 is supported by a shim plate 36 that has a top surface which is substantially flush with the top surface 38 of the rigid sheet 22. This support of the hinge plate 34 renders the cover assembly still less vulnerable to damage when the motor is turned in the shop for the performance of work thereon. It also helps to position the rigid sheet 22 at the appropriate level above the inspection opening 20.

Two bolts 40 and 41 extend through the plates 34 and 36 and are threaded into the motor housing 12 so as to affix the plates 34 and 36 to the motor housing.

The hinge 33 has a further hinge plate 42 which is welded or otherwise attached to the rigid sheet 22. The hinge plates 34 and 42 are interconnected in a conventional manner by hinge bosses 44 and are pivoted by a hinge pin 45 extending through the bosses 44 on the hinge plates 34 and 42.

Figure 3:
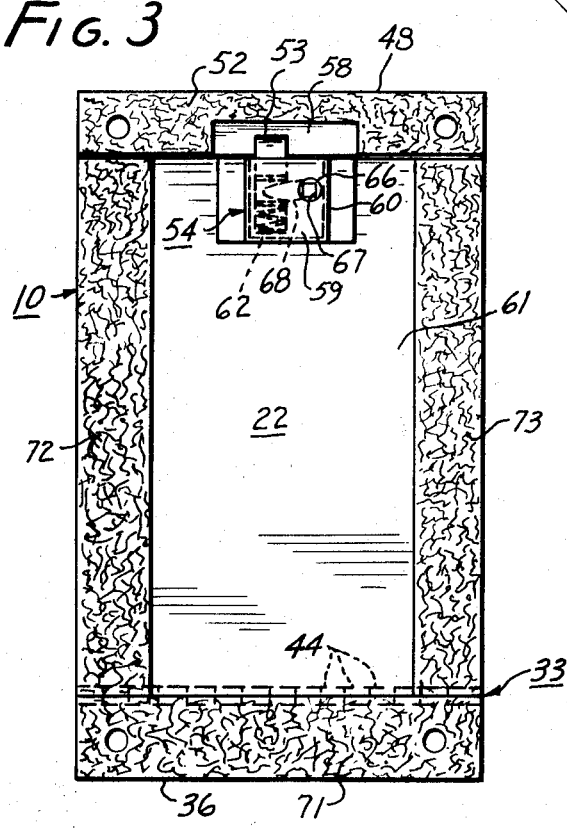
FIG. 3 is a bottom view of the cover as seen from a line 3 — 3 in FIG. 2.

The illustrated cover assembly 10 further includes what may be termed a catch plate 48 which is mounted by a pair of threaded bolts 50 and 51 at the upper end 25 of the inspection opening 20. The so-called catch plate 48 serves several purposes. First, it acts as a guard against damage to the cover when the traction motor is turned in the shop for the performance of work thereon. Secondly, it retains a gasket 52 (see FIG. 3) against the escape of cooling air from the motor housing. Thirdly, it serves as a catch for the movable bolt or locking member 53 of a lock assembly 54 of the cover assembly 10.

The plate 48 has a top surface 56 which is preferably flush with the top surface 38 of the rigid sheet 22. In connection with the lock assembly 54, the plate 48 may be considered as part of this lock assembly, inasmuch as one of its purposes is to catch the locking member 53 as mentioned above. If desired, a shim 58 may be attached to the bottom surface of the plate 48 where the locking member 53 moves into engagement therewith.

The lock 59 itself may be considered as a second part of the lock assembly 54.

The lock 59 has a housing 60 attached to the rigid sheet 22 at the lower surface 61 thereof by welding or other appropriate means. A spring 62 is located in the housing 60 for biasing the locking member 53 outwardly, so that a portion of the locking member 53 projects beyond the rigid sheet 22 and, when the cover is closed, projects below the plate 48 or shim 58. It can thus be said that the spring 62 biases the locking member 53 toward the catch or retention plate 48.

As best seen in FIG. 2, the locking member 53 has an inclined or curved surface 64 which is positioned to engage the catch or retention plate 48 and to effect movement of the locking member 53 in a direction away from the plate 48 during movement of the rigid sheet 22 toward the inspection opening 20. In this manner, it is possible to close the cover by a mere pushing motion against the rigid sheet 22 with the palm of a hand. This provides a very substantial simplification in operation over the latch devices that have been proposed for the subject purpose over the last 70 years.

The lock 59 includes an actuating member 66 which has a square bore 67 and a finger 68 that engages the locking member 53 and that moves this locking member to a retracted position away from the catch plate 48 or shim 58 upon rotation of the actuating member 66.

The lock actuating member 66 is accessible from the outside of the rigid sheet 22 as seen in FIG. 1. In accordance with principles of the subject invention, the lock actuating member 66 preferably is substantially located below the top surface 38 of the rigid sheet 22. The expression "substantially located" in the latter sentence is intended to means that the bulk of the lock actuating member 66 is located below the top surface 38 of the sheet 22. It is, however, permissible that the outer top surface of the locking member 66 be flush with the top surface 38 of the sheet 22 or exceed that top surface 38 only insignificantly. The important thing is that the cover assembly according to the subject invention have no projecting locking parts that could be damaged during shipping, use or servicing of the traction motor or during turning thereof in the repair or maintenance shop.

The lock 59 is easily actuated by a screw driver 70 or other handy tool that is inserted into the square bore 67.

A further gasket member 71 is attached to the hinge shim plate 36 and further gasket members 72 and 73 are attached to the lower side of the rigid sheet 22 to provide for sealing engagement of the cover with the motor housing, thereby preventing an escape of forced cooling air and a contamination of internal motor parts.

It will now be recognized that the subject invention breaks a long-standing logjam in the design of covers for traction motor inspection openings and provides several technological advances in that art.

I claim:

1. In a railroad electric traction motor the improvement comprising in combination:
   commutator means;
   a curved motor housing enclosing said commutator means except for a commutator inspection opening in said housing, said commutator inspection opening having a first end, a second end spaced from said first end, and spaced sides extending between said first and second ends;
   a rigid sheet of metal curved substantially in conformity with the curvature of said housing at said inspection opening and having a length extending substantially from said first end to said second end of said inspection opening, and a width spanning said inspection opening from side to side and overlapping portions of said housing at said sides of the inspection opening, and said rigid sheet having a top surface facing away from said inspection opening;
   hinge means connectable to said housing at said first end of said inspection opening and connected to said rigid sheet for permitting selective opening and closing of said inspection opening by said rigid sheet;
   lock means having first and second parts selectively engageable with each other and selectively disengageable from each other;
   means connectable to said housing for mounting said first part of the lock means on said housing at said second end of said inspection opening; and
   means connected to said rigid sheet for mounting said second part of the lock means below said top surface of the rigid sheet in a position wherein said first and second parts of said lock means are selectively engageable with each other upon closure of said inspection opening by said rigid sheet.

2. The invention of claim 1, wherein:
   said first part of said lock means is a locking member retention plate mountable on said housing at said second end of said inspection opening and in proximity to said rigid sheet; and
   said second part of said lock means includes a selectively actuable locking member located below said top surface of the rigid sheet and movable below said retention plate when said inspection opening is closed by said rigid plate.

3. The invention of claim 2, wherein:
   said lock means include spring means for biasing said locking member toward said retention plate.

4. The invention of claim 3, wherein:
   said locking member has an inclined surface positioned to engage said retention plate and effect movement of said locking member in a direction away from said retention plate during movement of said rigid sheet toward said inspection opening.

5. The invention of claim 3, wherein:
   said lock means include means for actuating said locking member, said actuating means being substantially located below said top surface of the rigid sheet.

6. The invention of claim 1, including:
   a first gasket between said rigid sheet and said housing, and a second gasket between said rigid sheet and said housing, said rigid sheet and said housing contacting said first and second gaskets when said rigid sheet closes said inspection opening.

7. The invention of claim 6, wherein:
   said first and second gaskets are connected to said rigid sheet.

8. The invention of claim 1, wherein:
   said first part of said lock means is a locking member retention plate;
   said means for mounting said first part of said lock means include means for mounting said retention plate on said housing at said second end of said inspection opening substantially flush with said rigid sheet when said inspection opening is closed by said rigid sheet;
   said rigid sheet has a lower surface opposite said top surface and facing into said housing;
   said second part of said lock means includes a locking member and means connected to said rigid sheet at said lower surface for mounting said locking member below said lower surface of the rigid sheet for movement between an extended position in which a portion of said locking member extends beyond said rigid sheet and below said retention plate when said rigid sheet closes said inspection opening, and a retracted position in which said locking member clears said retention plate for an opening of said rigid sheet; and
   said lock means include selectively actuable means substantially located below said top surface of said rigid sheet.

9. The invention of claim 8, wherein:
   said lock means include means for biasing said locking member to its extended position; and
   said locking member has an inclined surface positioned to engage said retention plate and effect movement of said locking member in a direction away from said retention plate during movement of said rigid sheet toward said inspection opening.

10. The invention as claimed in claim 1, wherein:
    said first end of said inspection opening is nearer the bottom of said motor housing than said second end; and
    said hinge means have first hinge plate means connected to said motor housing at said first end of said inspection opening, second hinge plate means connected to said rigid sheet substantially at said first end of said inspection opening, and means for pivotally interconnecting said first and second hinge plate means.

11. In combination with a railroad electric traction motor having (a) a curved housing, (b) commutator means inside said housing, and (c) a commutator inspection opening in said housing, said commutator inspection opening having a first end, a second end spaced from said first end, and spaced sides extending between said first and second ends;
    the improvement comprising in combination:
    a rigid sheet of metal curved substantially in conformity with the curvature of said housing at said inspection opening and having a length extending substantially from said first end to said second end of said inspection opening, and a width spanning said inspection opening from side to side and overlapping portions of said housing at said sides of the inspection opening, and said rigid sheet having a top surface facing away from said inspection opening;
    hinge means connectable to said housing at said first end of said inspection opening and connected to said rigid sheet for permitting selective opening and closing of said inspection opening by said rigid sheet;
    lock means having a locking member retention plate mounted on said housing at said second end of said inspection opening and in proximity to said rigid sheet, a selectively actuable locking member engageable with and disengageable from said locking member retention plate, spring means for biasing said locking member toward said retention plate, and means for mounting said locking member below said top surface of the rigid sheet for movement below said retention plate upon closure of said inspection opening by said rigid sheet, said locking member having an inclined surface positioned to engage said retention plate and effect movement of said locking member in a direction away from said retention plate during movement of said rigid sheet toward said inspection opening and preparatory to said movement of the locking member below said retention plate.

12. In combination with a railroad electric traction motor having (a) a curved housing, (b) commutator means inside said housing, and (c) a commutator inspection opening in said housing, said commutator inspection opening having a first end, a second end spaced from said first end, and spaced sides extending between said first and second ends;

the improvement comprising in combination:

a rigid sheet of metal curved substantially in conformity with the curvature of said housing at said inspection opening and having a length extending substantially from said first end to said second end of said inspection opening, and a width spanning said inspection opening from side to side and overlapping portions of said housing at said sides of the inspection opening, and said rigid sheet having a top surface facing away from said inspection opening and a lower surface opposite said top surface and facing into said housing;

hinge means connectable to said housing at said first end of said inspection opening and connected to said rigid sheet for permitting selective opening and closing of said inspection opening by said rigid sheet;

lock means having a locking member retention plate, means for mounting said retention plate on said housing at said second end of said inspection opening substantially flush with said rigid sheet when said inspection opening is closed by said rigid sheet, a locking member, means connected to said rigid sheet at said lower surface for mounting said locking member below said lower surface of the rigid sheet for movement between an extended position in which a portion of said locking member extends beyond said rigid sheet and below said retention plate when said rigid sheet closes said inspection opening, and a retracted position in which said locking member clears said retention plate for an opening movement of said rigid sheet relative to said inspection opening, and selectively actuable means accessible from above said top surface of said rigid sheet and substantially located below said top surface of said rigid sheet and coupled to said locking member for actuating said locking member from said extended position to said retracted position.

13. The invention of claim 12, wherein:

said lock means include means for biasing said locking member to its extended position; and said locking member has an inclined surface positioned to engage said retention plate and effect movement of said locking member in a direction away from said retention plate during movement of said rigid sheet toward said inspection opening.

* * * * *